(12) United States Patent
Tsuruta et al.

(10) Patent No.: US 10,120,145 B2
(45) Date of Patent: Nov. 6, 2018

(54) OPTICAL ELEMENT WITH ANNULAR LIGHT-COLLECTING AREA FORMING AN ANNULAR IMAGE OUTSIDE ITSELF

(71) Applicant: NALUX CO., LTD., Osaka-shi, Osaka (JP)

(72) Inventors: Soshi Tsuruta, Osaka (JP); Hironori Horikiri, Osaka (JP); Hisashi Maki, Osaka (JP); Takahiro Fujioka, Osaka (JP); Katsumoto Ikeda, Osaka (JP)

(73) Assignee: NALUX CO., LTD., Osaka (JP)

( * ) Notice: Subject to any disclaimer, the term of this patent is extended or adjusted under 35 U.S.C. 154(b) by 0 days.

(21) Appl. No.: 15/946,125

(22) Filed: Apr. 5, 2018

(65) Prior Publication Data

US 2018/0224612 A1 Aug. 9, 2018

Related U.S. Application Data

(63) Continuation of application No. PCT/JP2015/079824, filed on Oct. 22, 2015.

(51) Int. Cl.
  *G02B 6/42* (2006.01)
(52) U.S. Cl.
  CPC .......... *G02B 6/4214* (2013.01); *G02B 6/4221* (2013.01)
(58) Field of Classification Search
  CPC ....... G02B 6/42; G02B 6/4214; G02B 6/4221
  See application file for complete search history.

(56) References Cited

U.S. PATENT DOCUMENTS

| 4,584,988 A * | 4/1986 | Nishioka | A61B 1/00096 600/177 |
| 8,885,987 B2 * | 11/2014 | Augusto | G02B 6/12 385/14 |
| 9,036,960 B2 * | 5/2015 | Augusto | G02B 6/12 385/14 |

(Continued)

FOREIGN PATENT DOCUMENTS

| JP | 2-101405 A | 4/1990 |
| JP | 11-119063 A | 4/1999 |

(Continued)

OTHER PUBLICATIONS

International Preliminary Report on Patentability (IPRP) for WO 2016/147378 A1 of Ikeda et al. for PCT/JP2015/058242.*

(Continued)

*Primary Examiner* — Andrew Jordan
(74) *Attorney, Agent, or Firm* — Squire Patton Boggs (US) LLP

(57) ABSTRACT

An optical element to be interposed between an optical transmission line and a light-emitting element or a light-receiving element such that an optical path from one side to the other passes through the optical element is provided. At least one surface of the optical element is provided with a first light-collecting area and a second light-collecting area. A surface of the first light-collecting area is configured such that light from the one side is received by the other side. A surface of the second light-collecting area is an annular surface or a part of the annular surface and is configured such that light that has passed through the second light-collecting area forms an image in the shape of a ring or a part of the ring at a position between the optical element and the other side.

10 Claims, 7 Drawing Sheets

(56) References Cited

U.S. PATENT DOCUMENTS

| | | | |
|---|---|---|---|
| 2008/0138091 A1 | 6/2008 | Shimoguchi | |
| 2013/0050837 A1* | 2/2013 | Popp .................... | G02B 6/3604 |
| | | | 359/641 |
| 2014/0368924 A1* | 12/2014 | Tateishi ................ | G02B 7/003 |
| | | | 359/641 |

FOREIGN PATENT DOCUMENTS

| | | | | |
|---|---|---|---|---|
| JP | 2006-258964 A | 9/2006 | | |
| JP | 2008-145678 A | 6/2008 | | |
| JP | WO 2016147378 A1 * | 9/2016 | ............... | G02B 6/32 |
| JP | WO 2017068683 A1 * | 4/2017 | ............... | G02B 6/42 |

OTHER PUBLICATIONS

Written Opinion for WO 2017/068683 of Tsurta et al. for PCT/JP2015/079824.*

International Search Report/ISR for WO 2017/068683 of Tsurta et al. for PCT/JP2015/079824.*

IPRP for WO 2017/068683 of Tsurta et al. for PCT/JP2015/079824.*

* cited by examiner

OPTICAL ELEMENT WITH ANNULAR LIGHT-COLLECTING AREA FORMING AN ANNULAR IMAGE OUTSIDE ITSELF

BACKGROUND

Technical Field

The present invention relates to an optical element for connecting an optical transmission line and a light-emitting element or a light-receiving element.

Background Art

In optical communication, an optical element is used for connecting an optical transmission line and a light-emitting element or a light-receiving element. In some cases, such an optical element is required to reduce an amount of light for safety reasons, on grounds of communication standards or the like. Conventionally, in these cases, an optical element containing a light-absorbing material or an optical element provided with a light shielding film on a surface has been used (for example, JPH11119063A). Further, an optical element provided with grooves on a surface for reducing an amount of light has been developed (for example, JP2008145678A).

On the other hand, in an optical system including a light-emitting element, an optical transmission line and an optical element for optically connecting the both elements, for example, alignment between the light-emitting element and the optical element takes a lot of work.

An optical element for connecting an optical transmission line and a light-emitting element or a light-receiving element, which allows easy alignment with the light-emitting element, for example, has not been developed.

PATENT DOCUMENTS

Paten document 1: JPH11119063A
Paten document 2: JP2008145678A

Accordingly, there is a need for an optical element for connecting an optical transmission line and a light-emitting element or a light-receiving element, which allows easy alignment with the light-emitting element, for example.

SUMMARY OF THE INVENTION

An optical element according to an embodiment of the present invention is designed to be interposed between an optical transmission line and a light-emitting element or a light-receiving element such that an optical path from one side to the other passes through the optical element. At least one surface of the optical element is provided with a first light-collecting area and a second light-collecting area, with an optical path of a ray of light passing through the center of the light-emitting element or the light-receiving element, the center of the optical element and the center of a face of the optical transmission line as an optical axis, a surface of the first light-collecting area is configured such that light from the one side is received by the other side and a surface of the second light-collecting area is configured such that light from the one side forms an image at a position between the optical element and the other side, and the surface of the second light-collecting area is formed as an annular shape the center of which is on the optical axis or formed as a part of the annular shape and is configured such that light that has passed through the second light-collecting area forms the image in the shape of a ring or a part of the ring at the position.

According to the present embodiment, an amount of light that is transmitted from the one side to the other can be reduced by a desired extent by adjusting the ratio between the size of the first light-collecting area and the size of the second light-collecting area. Further, alignment of the optical system can easily be carried out by observing the image in the shape of a ring or a part of the ring that is formed by the light that has passed through the second light-collecting area.

In an optical element according to another embodiment of the present invention, the at least one surface is the surface on the exit side of the optical element.

An optical element according to another embodiment of the present invention is configured such that light that has entered the surface on the entrance side of the optical element is collimated to a beam parallel to the optical axis and then made to enter the surface on the exit side.

In an optical element according to another embodiment of the present invention, when the refractive power of the first light-collecting area is represented as $\phi_0$, the refractive power of the second light-collecting area is represented as $\phi_j$ and the distance in the optical axis direction between the vertex of the surface of the first light-collecting area and the vertex of the surface of the second light-collecting area is represented as $lj$, the first and second light-collecting areas are configured such that $$1.4\phi_0 < \phi_j < 1/lj$$

is satisfied.

According to the present embodiment, a considerable amount of light that has passed through the second light-collecting area is not received by the other side.

In an optical element according to another embodiment of the present invention, the first and second light-collecting areas are configured such that $$2.0\phi_0 < \phi_j$$

is further satisfied.

In an optical element according to another embodiment of the present invention, the first light-collecting area and the second light-collecting area are configured such that an optical path of light that has travelled from the one side and has passed through the first light-collecting area and an optical path of light that has travelled from the one side and has passed through the second light-collecting area do not overlap with each other.

According to the present embodiment, an optical path of light that has travelled from the one side and has passed through the first light-collecting area and an optical path of light that has travelled from the one side and has passed through the second light-collecting area do not overlap with each other, and therefore the image in the shape of a ring or a part of the ring that is formed by the second light-collecting area becomes clear and advantageous for observation.

In an optical element according to another embodiment of the present invention, the surface of the first light-collecting area is of the shape that is obtained by rotating a curve by a certain angle around the optical axis as the central axis.

In an optical element according to another embodiment of the present invention, the surface of the second light-collecting area is of the shape that is obtained by rotating a curve by a certain angle around the optical axis as the central axis.

According to the present embodiment, the ratio between the size of the first light-collecting area and the size of the second light-collecting area can be adjusted by changing the certain angle.

In an optical element according to another embodiment of the present invention, the at least one surface is provided with a plurality of second light-collecting areas.

According to the present embodiment, the ratio between the size of the first light-collecting area and the size of the second light-collecting area can be adjusted by changing the number of second light-collecting areas.

In an optical element according to another embodiment of the present invention, the first light-collecting area and the second light-collecting area are configured such that the amount of light that is transmitted from the one side to the other is reduced by 10% to 40% compared with an optical element formed by the first light-collecting area alone.

DESCRIPTION OF EMBODIMENTS

Figure 1:
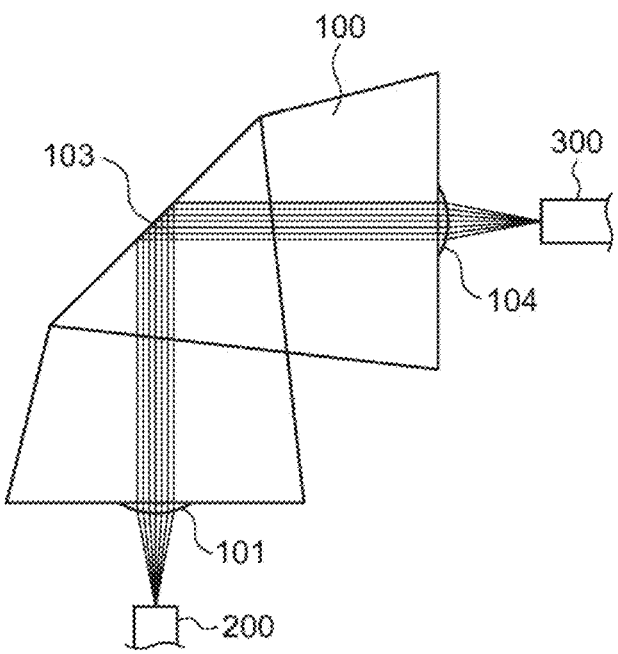
FIG. 1 shows an example of an arrangement of an optical system including an optical element.

FIG. 1 shows an example of an arrangement of an optical system including an optical element 100. The optical system includes a light-emitting element 200, an optical transmission line 300, an optical element 100 for optically connecting the both elements. A divergent beam emitted by the light-emitting element 200 is collimated by an entrance surface 101 of the optical element 100, reflected by a total reflection surface 103 of the optical element 100, and converged onto the optical transmission line 300 by an exit surface 104 of the optical element 100.

Figure 2:
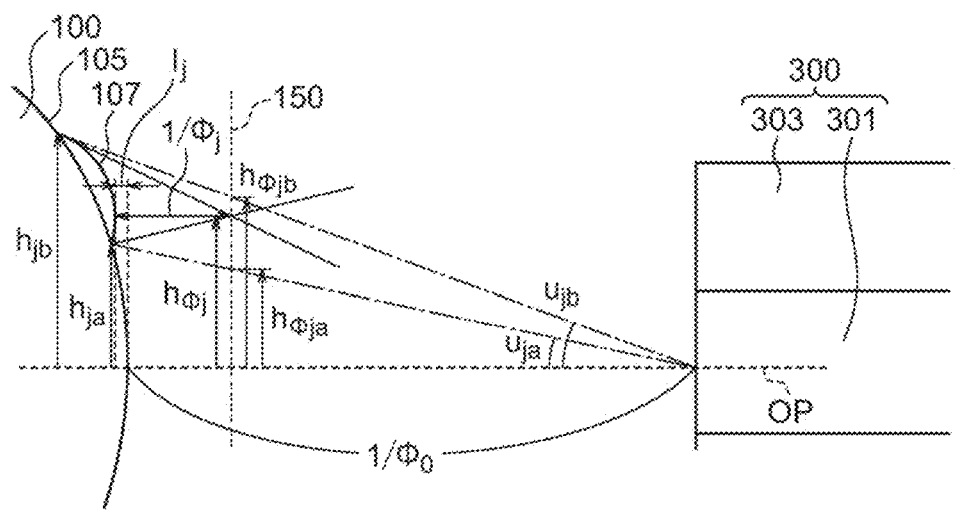
FIG. 2 illustrates a first light-collecting area and a second light-collecting area of the exit surface of the optical element.

FIG. 2 illustrates a first light-collecting area and a second light-collecting area of the exit surface 104 of the optical element 100. The first light-collecting area is configured such that light that passes through a surface 105 of the first light-collecting area is received by the optical transmission line (an optical fiber) 300, and the second light-collecting area is configured such that a certain amount of light that passes through a surface 107 of the second light-collecting area is not received by the optical fiber 300. The optical path that passes through the centers of curvature of the both surfaces of the optical element 100 and the center of the end face of the optical fiber 300 that is the optical transmission line are defined as an optical axis OP. FIG. 2 is a cross section containing the optical axis OP. In FIG. 2, the optical axis OP and the central axis of the optical fiber 300 coincide with each other. The optical fiber 300 consists of a core 301 containing the central axis and a cladding 303 formed around the core 301.

In FIG. 2, optical paths of rays of light that have travelled parallel to the optical axis and have passed through the surface 105 of the first light-collecting area are represented by dot-and-dash lines. The surface 105 of the first light-collecting area of the exit surface 104 of the optical element 100 is configured so as to converge a beam parallel to the optical axis onto the center of the end face of the optical fiber 300. Alternatively, the surface 105 of the first light-collecting area may be configured so as to converge a beam parallel to the optical axis onto a point on or around the optical axis OP and in the vicinity of the center of the end face of the optical fiber 300. As described above, the surface 105 of the first light-collecting area is configured such that light passing through the surface is received by the optical fiber.

The surface 107 of the second light-collecting area of the exit surface 104 of the optical element 100 is formed in an annular shape on the exit surface. The boundaries of the annular shape with the surface 105 of the first light-collecting area are a circle consisting of points at a distance of $h_{ja}$ from the optical axis and a circle consisting of points at a distance of $h_{jb}$ from the optical axis. In FIG. 2, optical paths of rays of light that have travelled parallel to the optical axis and have passed through the surface 107 of the second light-collecting area are represented by solid lines. The surface 107 of the second light-collecting area is configured such that rays of light that travel parallel to the optical axis and passes through the surface 107 of the second light-collecting area are converged onto points at a distance of $h_{\phi_j}$ from the optical axis on a plane 150 perpendicular to the optical axis. The set of the above-described points are an image formed on the plane 150 by the second light-collecting area, and the shape is circular.

The refractive power of the first light-collecting area is represented as $\phi_0$ and the refractive power of the second light-collecting area is represented as $\phi_j$. $\phi_0$ and $\phi_j$ are positive. Refractive power is the inverse of a focal length. lj represents the distance in the optical axis direction, that is, the direction of sag between the vertex of the surface 105 of the first light-collecting area and the vertex of the surface 107 of the second light-collecting area. A vertex of a surface means the center of curvature of the surface.

The plane 150 must be located nearer to the optical fiber 300 than the vertex of the surface 105 of the first light-collecting area. Accordingly, the following condition must be satisfied.

$$lj < 1/\phi_j \tag{1}$$

Expression (1) can be changed to the expression shown below.

$$\phi_j < 1/lj$$

In order that a considerable amount of rays of light that have passed through the surface 107 of the second light-collecting area is not received by the optical fiber 300, the refractive power $\phi_j$ of the second light-collecting area must be by a good deal greater than the refractive power $\phi_0$ of the first light-collecting area. More specifically, the following condition should preferably be satisfied.

$$1.4\phi_0 < \phi_j \quad (2)$$

Further, the following condition should more preferably be satisfied.

$$2.0\phi_0 < \phi_j \quad (3)$$

The distance between the optical axis and the point of intersection of a ray of light that has traveled parallel to the optical axis and has passed thorough the point that is $h_{ja}$ distant from the optical axis and is on the surface 105 of the first light-collecting area and the plane 150 is represented as $h_{\phi ja}$, and the angle (acute angle) between the ray of light and the optical axis is represented as $u_{ja}$. Further, the distance between the optical axis and the point of intersection of a ray of light that has traveled parallel to the optical axis and has passed thorough the point that is $h_{jb}$ distant from the optical axis and is on the surface 105 of the first light-collecting area and the plane 150 is represented as $h_{\phi jb}$, and the angle (acute angle) between the ray of light and the optical axis is represented as $u_{jb}$.

A plurality of second light-collecting areas can be provided. In general, $h_{ja}$ represents the distance from the optical axis to the boundary on the side of the optical axis of the second light-collecting area that is the j-th closest to the optical axis, and $h_{jb}$ represents the distance from the optical axis to the boundary on the opposite side from the optical axis of the second light-collecting area that is the j-th closest to the optical axis. The position of the plane 150 for each surface of second light-collecting areas can be separated.

Figure 3:
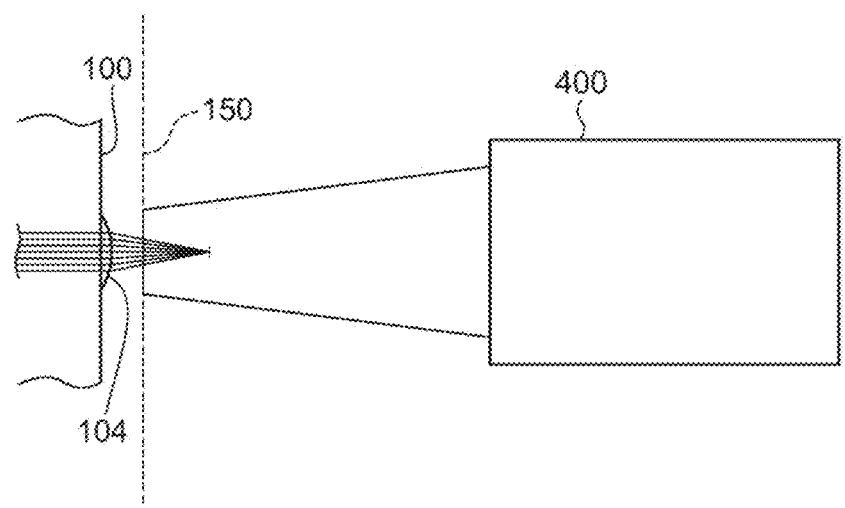
FIG. 3 shows an apparatus for taking a picture of an image formed by the second light-collecting area.

FIG. 3 shows an apparatus for taking a picture of an image formed by the second light-collecting area. The image is formed on the plane 150 between the exit surface 104 and the end face of the optical fiber 300. A picture of the image is taken by a photography apparatus 400 installed at a position more distant in the optical axis direction from the optical element 100 than the plane 150.

Figure 4:
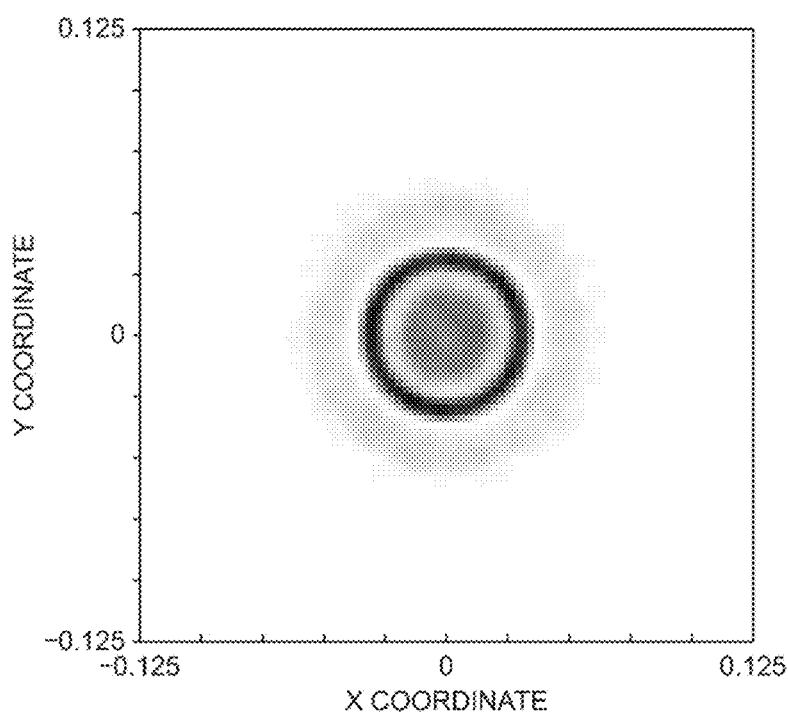
FIG. 4 shows an example of an image formed by the second light-collecting area.

FIG. 4 shows an example of an image formed by the second light-collecting area. The x coordinate and the y coordinate in the diagram show axes of coordinates that are orthogonal to each other on a plane perpendicular to the optical axis. In FIG. 4, an area of higher darkness shows a brighter area that receives a greater amount of light. In FIG. 4, the annular black area corresponds to the image in a circular shape formed by the second light-collecting area. In the absence of the second light-collecting area, the darkness is greatest at the center of the circle, and the darkness gradually decreases with distance from the center.

Figure 5:
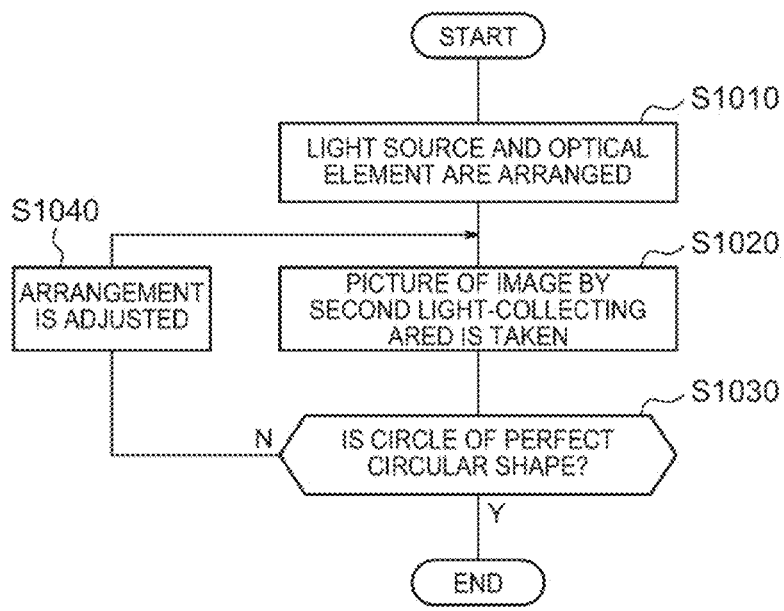
FIG. 5 is a flowchart for illustrating how to align the optical system using the image in a circular shape formed by the second light-collecting area.

FIG. 5 is a flowchart for illustrating how to align the optical system using the image in a circular shape formed by the second light-collecting area.

In step S1010 of FIG. 5, the light source 200 and the optical element 100 are arranged.

In step S1020 of FIG. 5, a picture of the image formed by the second light-collecting area is taken.

In step S1030 of FIG. 5, it is determined whether the circle in the taken picture is of a perfect circular shape or not. In order to determine whether the circle is of a perfect circular shape or not, amounts of light at three or more points that lie on a perfect circle are measured, and it is determined whether the amounts at the three points are identical or not. If the amounts at the three points are identical, the circle is determined to be of a perfect circular shape. If the circle in the taken picture is of a perfect circular shape, it is determined that the central axes of the light source 200 and the optical element 100 coincide with each other, and they are appropriately arranged, and therefore the process is determined. If the circle in the taken picture is not of a perfect circular shape, it is determined that the central axes of the light source 200 and the optical element 100 do not coincide with each other, and the process goes to step S1040.

In step S1040 of FIG. 5, based on the shape of the circle of the image in the taken picture, the arrangement of the light source 200 and the optical element 100 is adjusted such that the central axes of the both coincide with each other.

Further, by measuring amounts of light of the image in the circular shape, measurement of internal stress of the optical element, detection of foreign materials therein can be carried out in addition to the above-described alignment of the optical system.

When the image that is formed by the second light-collecting area as shown in FIG. 4 is observed, it is preferable that a beam of light formed by the second light-collecting area does not overlap with a beam of light formed by the first light-collecting area. The conditions for avoiding an overlap between a beam of light formed by the second light-collecting area and a beam of light formed by the first light-collecting area will be described below.

Figure 6:
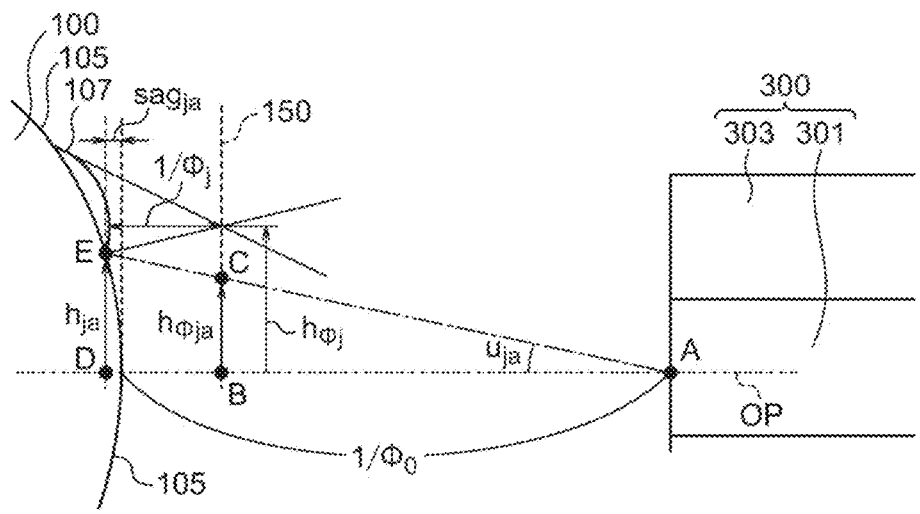
FIG. 6 illustrates the first light-collecting area and the second light-collecting area of the exit surface 104 of the optical element.

FIG. 6 illustrates the first light-collecting area and the second light-collecting area of the exit surface 104 of the optical element 100. FIG. 6 shows a cross section containing the optical axis OP. Reference letters and numerals are identical with those shown in FIG. 2. An amount of sag of the surface forming the first light-collecting area at the boundary on the side of the optical axis of the second light-collecting area that is the j-th closest to the optical axis is represented as $sag_{ja}$. As described above, $l_j$ represents distance in the optical axis direction between the vertex of the surface 105 of the first light-collecting area and the vertex of the surface 107 of the second light-collecting area.

In FIG. 6, the following expression holds concerning the triangle with apexes A, B and C.

$$\tan u_{ja} = \frac{h_{\phi ja}}{1/\phi_0 - 1/\phi_j + l_j}$$

The following expression holds concerning the triangle with apexes A, D and E.

$$\tan u_{ja} = \frac{h_{ja}}{1/\phi_0 + sag_{ja}}$$

From the two expressions described above, the following expression holds.

$$\frac{h_{\phi ja}}{1/\phi_0 - 1/\phi_j + l_j} = \frac{h_{ja}}{1/\phi_0 + sag_{ja}}$$

From the expression described above, the following expression is obtained.

$$h_{\phi ja} = \frac{h_{ja}(1/\phi_0 - 1/\phi_j + l_j)}{1/\phi_0 + sag_{ja}}$$

In order that in FIG. 6, a beam of light represented by solid lines and formed by the second light-collecting area that is the j-th closest to the optical axis does not overlap with a beam of light represented by a dot-and-dash line and formed by the adjacent portion on the optical axis side in the first light-collecting area, the following expression must hold.

$$h_{\phi j} > h_{\phi j a}$$

Accordingly, the following expression must hold.

$$h_{\phi j} > \frac{h_{j a}(1/\phi_0 - 1/\phi_j + l_j)}{1/\phi_0 + sag_{j a}} \quad (4)$$

Figure 7:
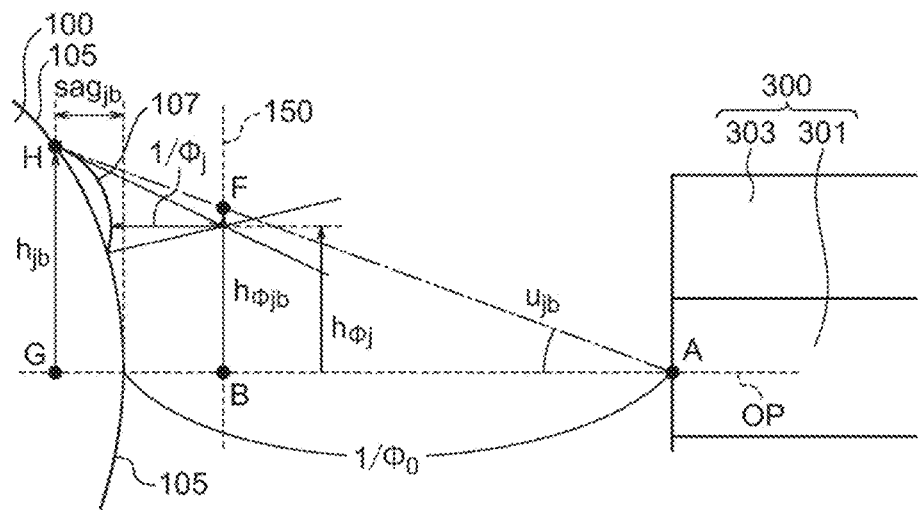
FIG. 7 illustrates the first light-collecting area and the second light-collecting area of the exit surface of the optical element.

FIG. 7 illustrates the first light-collecting area and the second light-collecting area of the exit surface 104 of the optical element 100. FIG. 7 shows a cross section containing the optical axis OP. Reference letters and numerals are identical with those shown in FIG. 2. An amount of sag of the surface forming the first light-collecting area at the boundary on the opposite side from the optical axis of the second light-collecting area that is the j-th closest to the optical axis is represented as sap.

In FIG. 7, the following expression holds concerning the triangle with apexes A, G and H.

$$\tan u_{jb} = \frac{h_{jb}}{1/\phi_0 + sag_{jb}}$$

The following expression holds concerning the triangle with apexes A, B and F.

$$\tan u_{jb} = \frac{h_{\phi jb}}{1/\phi_0 - 1/\phi_j + l_j}$$

From the two expressions described above, the following expression holds.

$$\frac{h_{\phi jb}}{1/\phi_0 - 1/\phi_j + l_j} = \frac{h_{jb}}{1/\phi_0 + sag_{jb}}$$

From the expression described above, the following expression is obtained.

$$h_{\phi jb} = \frac{h_{jb}(1/\phi_0 - 1/\phi_j + l_j)}{1/\phi_0 + sag_{jb}}$$

In order that in FIG. 7, a beam of light represented by solid lines and formed by the second light-collecting area that is the j-th closest to the optical axis does not overlap with a beam of light represented by a dot-and-dash line and formed by the adjacent portion on the opposite side from the optical axis in the first light-collecting area, the following expression must hold.

$$h_{\phi j} < h_{\phi j b}$$

Accordingly, the following expression must hold.

$$h_{\phi j} < \frac{h_{jb}(1/\phi_0 - 1/\phi_j + l_j)}{1/\phi_0 + sag_{jb}} \quad (5)$$

If Expression (4) and Expression (5) are satisfied, the beam of light formed by the second light-collecting area does not overlap with the beam of light formed by the first light-collecting area.

Examples and a comparative example of the present invention will be described below.

Optical System of the Examples and the Comparative Example

A layout of an optical system of the examples and the comparative example is as shown in FIG. 1. The optical system includes the light-emitting element 200, the optical transmission line 300, the optical element 100 for optically connecting the both elements. A divergent beam emitted by the light-emitting element 200 is collimated by the entrance surface 101 of the optical element 100, reflected by the total reflection surface 103 of the optical element 100, and converged onto the optical fiber 300 that is the optical transmission line by the exit surface 104 of the optical element 100.

In FIG. 1, the optical path of the ray of light that passes through the center of the optical element 100, the center of curvature (vertex) of the entrance surface 101, the center of curvature (vertex) of the surface 105 of the first light-collecting area and the center of the end face of the optical fiber 300 is defined as an optical axis. The optical path connecting the center of curvature (vertex) of the entrance surface 101 and the center of curvature (vertex) of the surface 105 of the first light-collecting area passes through the center of the optical element 100, and therefore the optical axis passes through the center of the optical element 100.

The light-emitting element 200 is a laser diode light source such as a VCSEL light source, and the wavelength is 850 nm. The beam divergence angle of the light source 200 is 0.19 when represented in numerical aperture. The distance between the light source 200 and the entrance surface 101 is 0.3158 mm, the distance between the entrance surface 101 and the total reflection surface 103 that rotates the optical axis by 90 degrees is 0.9842 mm, the distance between the total reflection surface 103 and the exit surface 104 is 0.9848 mm and the distance between the exit surface 104 and the end face of the optical fiber 300 that is the optical transmission line is 0.3152. The above-described values of distance are those along the optical axis. The diameter of the optical fiber 300 (the diameter of the core 301) is 50 μm, and the acceptance angle is 0.2 when represented in numerical aperture.

The material of the optical element 100 is an amorphous thermoplastic polyetherimide (PEI) resin. The refractive index is 1.663 (d line; 587.56 nm), and the Abbe's number is 20.09 (d line; 587.56 nm). Further, the refractive index of the above-described resin at the wavelength of the laser diode light source 200 of 850 nm is 1.638. As a material of the optical element 100, a polymethylmethacrylate (PMMA) resin, a polycarbonate (PC), an epoxy or a glass material is usable.

The shape of the entrance surface 101 is common to all the examples and the comparative example and can be represented by the following expression.

$$z = \frac{cr^2}{1 + \sqrt{1-(1+k)c^2r^2}} + \sum_{i=1}^{N} A_i r^i$$

$$c = 1/R$$

$$r^2 = x^2 + y^2$$

r represents distance in a direction perpendicular to the optical axis, and z represents coordinate in the optical axis direction with respect to the vertex of the entrance surface 101. Concerning z, the direction in which light travels is the positive direction. c represents curvature, R represents radius of curvature, k represents the conic constant, i represents degree of the aspherical surface and Ai represents an aspherical coefficient.

The entrance surface 101 is of the shape that is obtained by rotating the curve expressed by the above-described mathematical expression around the optical axis.

Table 1 shows constants of the entrance surface.

TABLE 1

| R | 0.2020 |
|---|---|
| k | −2.5499 |

The Exit Surface of the Comparative Example

Figure 8:
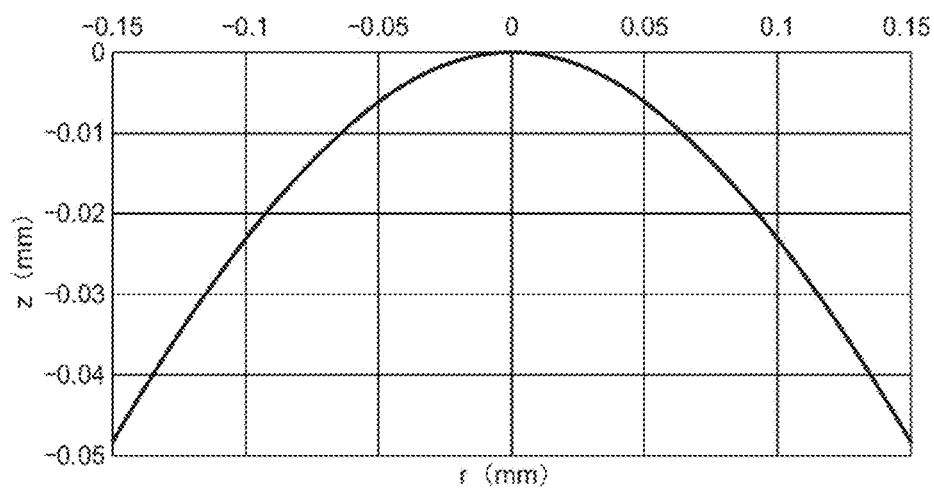
FIG. 8 shows a cross section of the exit surface of the comparative example, which contains the optical axis.

FIG. 8 shows a cross section of the exit surface of the comparative example, which contains the optical axis. The exit surface of the comparative example does not have a second light-collecting area.

The shape of a cross section of the exit surface, which contains the optical axis can be expressed by the following mathematical expression.

$$z = \frac{cr^2}{1 + \sqrt{1-(1+k)c^2r^2}} + \sum_{i=1}^{N} A_i r^i$$

$$c = 1/R$$

$$r^2 = x^2 + y^2$$

r represents distance in a direction perpendicular to the optical axis, and z represents coordinate in the optical axis direction with respect to the vertex of the exit surface (the point at which r=0 and z=0 in FIG. 8). Concerning z, the direction in which light travels is the positive direction. c represents curvature, R represents radius of curvature, k represents the conic constant, i represents degree of the aspherical surface and Ai represents an aspherical coefficient.

The exit surface is of the shape that is obtained by rotating the curve expressed by the above-described mathematical expression around the optical axis.

Table 2 shows constants of the exit surface.

TABLE 2

| R | −0.2012 |
|---|---|
| k | −2.3288 |

The convergence angle of a beam of light converged by the exit surface is 0.19 when represented in numerical aperture. The optical coupling efficiency from the light-emitting element 200 to the optical fiber 300 in the comparative example is 78.2%.

The Exit Surface of Example 1

Figure 9:
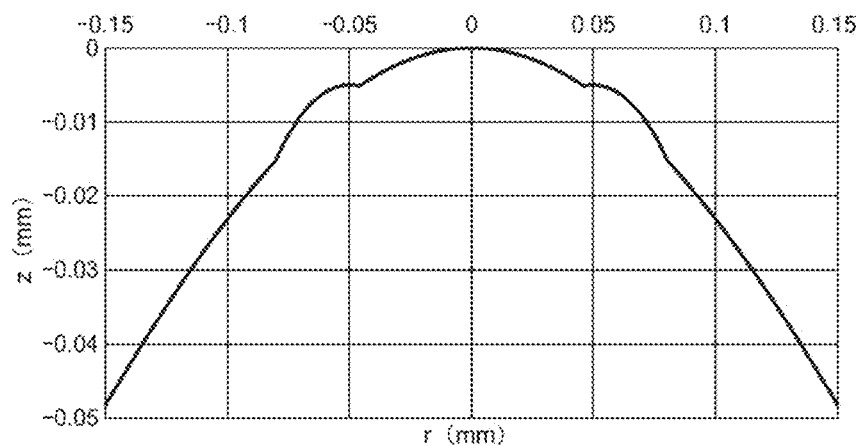
FIG. 9 shows a cross section of the exit surface of Example 1, which contains the optical axis.

FIG. 9 shows a cross section of the exit surface of Example 1, which contains the optical axis. Example 1 has one second light-collecting area.

The shapes of the surface of the first light-collecting area and the surface of the second light-collecting area of the exit surface can be expressed by the following mathematical expression.

$$z = \frac{cr^2}{1 + \sqrt{1-(1+k)c^2r^2}} + \sum_{i=1}^{N} A_i r^i$$

$$c = 1/R$$

$$r^2 = x^2 + y^2$$

c represents curvature, R represents radius of curvature, k represents the conic constant, i represents degree of the aspherical surface and Ai represents an aspherical coefficient.

The surface of the first light-collecting area is of the shape that is obtained by rotating the curve expressed by the above-described mathematical expression around the optical axis. r represents distance from the optical axis, and z represents coordinate in the optical axis direction with respect to the vertex of the exit surface (the point at which r=0 and z=0 in FIG. 9). Concerning z, the direction in which light travels is the positive direction.

Table 3 shows constants of the first light-collecting area of the exit surface.

TABLE 3

| R | −0.2012 |
|---|---|
| k | −2.3288 |

The surface of the second light-collecting area is of the shape that is obtained by rotating the curve that has the vertex at $r_1$=0.05 mm in the r direction and $z_1$=−0.005 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area of the exit surface is of an annular curved surface (a hump) in a range from r=0.046 mm to 0.080 mm with respect to the vertex of the first light-collecting area.

Table 4 shows constants of the second light-collecting area of the exit surface.

TABLE 4

| Items | Second light-collecting area |
|---|---|
| R | −0.0500 |
| k | 0.0000 |
| $r_1$ | 0.050 |
| $z_1$ | −0.005 |

The optical coupling efficiency from the light-emitting element 200 to the optical fiber 300 in Example 1 is 62.5%, and the amount of light that the optical fiber 300 receives is 79.9% of that in the case of the comparative example.

The Exit Surface of Example 2

Figure 10:
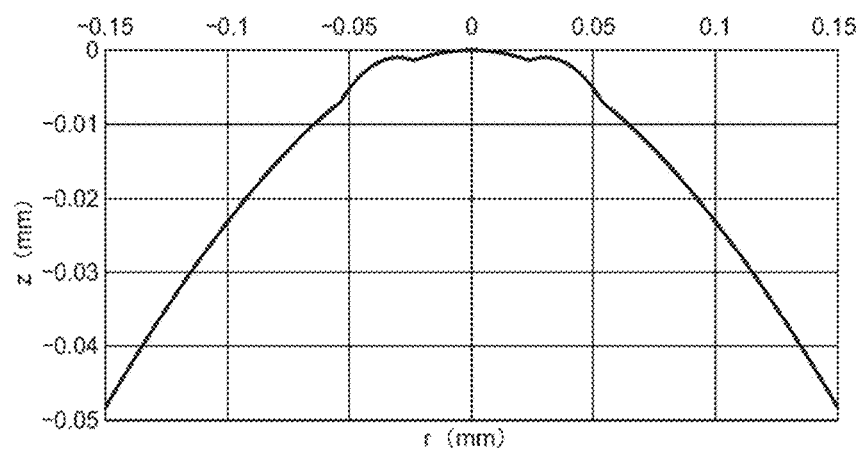
FIG. 10 shows a cross section of the exit surface of Example 2, which contains the optical axis.

FIG. 10 shows a cross section of the exit surface of Example 2, which contains the optical axis. Example 2 has one second light-collecting area.

The shapes of the surface of the first light-collecting area and the surface of the second light-collecting area of the exit surface can be expressed by the following mathematical expression.

$$z = \frac{cr^2}{1 + \sqrt{1-(1+k)c^2r^2}} + \sum_{i=1}^{N} A_i r^i$$

$$c = 1/R$$

$$r^2 = x^2 + y^2$$

c represents curvature, R represents radius of curvature, k represents the conic constant, i represents degree of the aspherical surface and Ai represents an aspherical coefficient.

The surface of the first light-collecting area is of the shape that is obtained by rotating the curve expressed by the above-described mathematical expression around the optical axis. r represents distance from the optical axis, and z represents coordinate in the optical axis direction with respect to the vertex of the exit surface (the point at which r=0 and z=0 in FIG. 10). Concerning z, the direction in which light travels is the positive direction.

Table 5 shows constants of the first light-collecting area of the exit surface.

TABLE 5

| | |
|---|---|
| R | −0.2012 |
| k | −2.3288 |

The surface of the second light-collecting area is of the shape that is obtained by rotating the curve that has the vertex at $r_1$=0.03 mm in the r direction and $z_1$=−0.001 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area of the exit surface is of an annular curved surface (a hump) in a range from r=0.024 mm to 0.054 mm with respect to the vertex of the first light-collecting area.

Table 6 shows constants of the second light-collecting area of the exit surface.

TABLE 6

| Items | Second light-collecting area |
|---|---|
| R | −0.0500 |
| k | 0.0000 |

TABLE 6-continued

| Items | Second light-collecting area |
|---|---|
| $r_1$ | 0.030 |
| $z_1$ | −0.001 |

The optical coupling efficiency from the light-emitting element 200 to the optical fiber 300 in Example 2 is 52.8%, and the amount of light that the optical fiber 300 receives is 67.6% of that in the case of the comparative example.

The Exit Surface of Example 3

Figure 11:
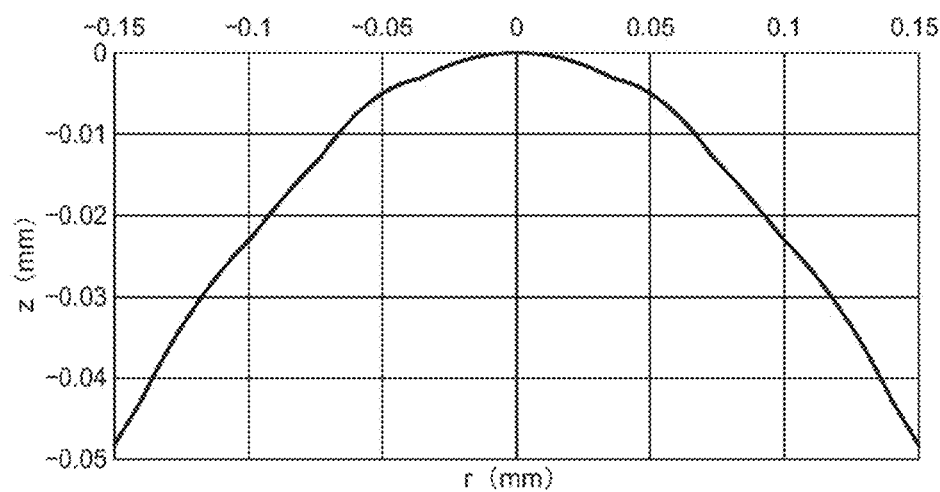
FIG. 11 shows a cross section of the exit surface of Example 3, which contains the optical axis.

FIG. 11 shows a cross section of the exit surface of Example 3, which contains the optical axis. Example 3 has two second light-collecting areas.

The shapes of the surface of the first light-collecting area and the surfaces of the second light-collecting areas can be expressed by the following mathematical expression.

$$z = \frac{cr^2}{1 + \sqrt{1-(1+k)c^2r^2}} + \sum_{i=1}^{N} A_i r^i$$

$$c = 1/R$$

$$r^2 = x^2 + y^2$$

c represents curvature, R represents radius of curvature, k represents the conic constant, i represents degree of the aspherical surface and Ai represents an aspherical coefficient.

The surface of the first light-collecting area is of the shape that is obtained by rotating the curve expressed by the above-described mathematical expression around the optical axis. r represents distance from the optical axis, and z represents coordinate in the optical axis direction with respect to the vertex of the exit surface (the point at which r=0 and z=0 in FIG. 11). Concerning z, the direction in which light travels is the positive direction.

Table 7 shows constants of the first light-collecting area of the exit surface.

TABLE 7

| | |
|---|---|
| R | −0.2012 |
| k | −2.3288 |

The surface of the second light-collecting area that is the closest to the optical axis is of the shape that is obtained by rotating the curve that has the vertex at $r_1$=0.030 mm in the r direction and $z_1$=−0.003 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area that is the closest to the optical axis is of an annular curved surface (a hump) in a range from r=0.036 mm to 0.073 mm with respect to the vertex of the first light-collecting area.

Table 8 shows constants of the second light-collecting area that is the closest to the optical axis.

TABLE 8

| Items | Second light-collecting area that is the closest to the optical axis |
|---|---|
| R | −0.1000 |
| k | 0.0000 |
| $r_1$ | 0.030 |
| $z_1$ | −0.003 |

The surface of the second light-collecting area that is the second closest to the optical axis is of the shape that is obtained by rotating the curve that has the vertex at $r_2$=0.050 mm in the r direction and $z_2$=−0.015 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area that is the second closest to the optical axis is of an annular curved surface (a hump) in a range from r=0.099 mm to 0.140 mm with respect to the vertex of the first light-collecting area.

Table 9 shows constants of the second light-collecting area that is the second closest to the optical axis.

TABLE 9

| Items | Second light-collecting area that is the second closest to the optical axis |
|---|---|
| R | −0.1400 |
| k | 0.0000 |
| $r_2$ | 0.050 |
| $z_2$ | −0.015 |

The optical coupling efficiency from the light-emitting element 200 to the optical fiber 300 in Example 3 is 62.8%, and the amount of light that the optical fiber 300 receives is 80.3% of that in the case of the comparative example.

The Exit Surface of Example 4

Figure 12:
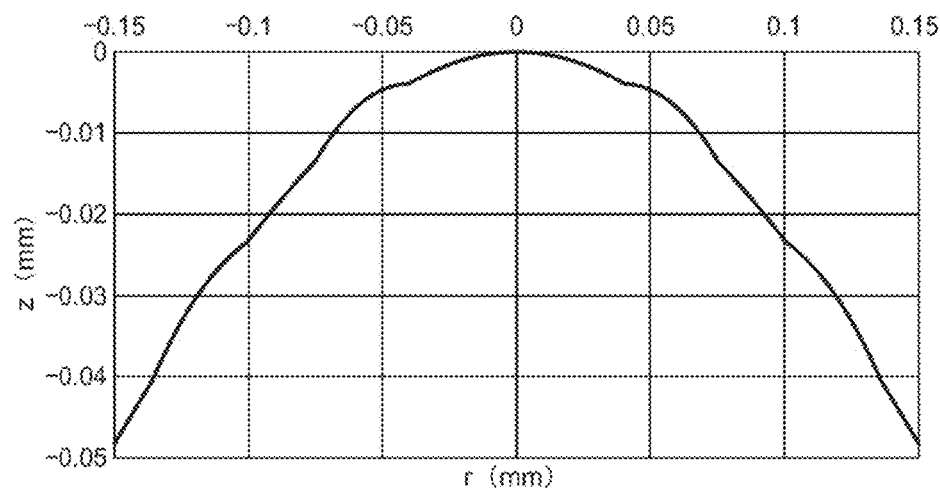
FIG. 12 shows a cross section of the exit surface of Example 4, which contains the optical axis.

FIG. 12 shows a cross section of the exit surface of Example 4, which contains the optical axis. Example 4 has two second light-collecting areas.

The shapes of the surface of the first light-collecting area and the surfaces of the second light-collecting areas can be expressed by the following mathematical expression.

$$z = \frac{cr^2}{1+\sqrt{1-(1+k)c^2r^2}} + \sum_{i=1}^{N} A_i r^i$$

$$c = 1/R$$

$$r^2 = x^2 + y^2$$

c represents curvature, R represents radius of curvature, k represents the conic constant, i represents degree of the aspherical surface and $A_i$ represents an aspherical coefficient.

The surface of the first light-collecting area is of the shape that is obtained by rotating the curve expressed by the above-described mathematical expression around the optical axis. r represents distance from the optical axis, and z represents coordinate in the optical axis direction with respect to the vertex of the exit surface (the point at which r=0 and z=0 in FIG. 12). Concerning z, the direction in which light travels is the positive direction.

Table 10 shows constants of the first light-collecting area of the exit surface.

TABLE 10

| R | −.2012 |
|---|---|
| k | −2.3288 |

The surface of the second light-collecting area that is the closest to the optical axis is of the shape that is obtained by rotating the curve that has the vertex at $r_1$=0.040 mm in the r direction and $z_1$=−0.004 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area that is the closest to the optical axis is of an annular curved surface (a hump) in a range from r=0.040 mm to 0.075 mm with respect to the vertex of the first light-collecting area.

Table 11 shows constants of the second light-collecting area that is the closest to the optical axis.

TABLE 11

| Items | Second light-collecting area that is the closest to the optical axis |
|---|---|
| R | −0.0700 |
| k | 0.0000 |
| $r_1$ | 0.040 |
| $z_1$ | −0.004 |

The surface of the second light-collecting area that is the second closest to the optical axis is of the shape that is obtained by rotating the curve that has the vertex at $r_2$=0.080 mm in the r direction and $z_2$=−0.021 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area that is the second closest to the optical axis is of an annular curved surface (a hump) in a range from r=0.101 mm to 0.136 mm with respect to the vertex of the first light-collecting area.

Table 12 shows constants of the second light-collecting area that is the second closest to the optical axis.

TABLE 12

| Items | Second light-collecting area that is the second closest to the optical axis |
|---|---|
| R | −0.0900 |
| k | 0.0000 |
| $r_2$ | 0.080 |
| $z_2$ | −0.021 |

The optical coupling efficiency from the light-emitting element 200 to the optical fiber 300 in Example 4 is 69.6%, and the amount of light that the optical fiber 300 receives is 89.0% of that in the case of the comparative example.

The Exit Surface of Example 5

Figure 13:
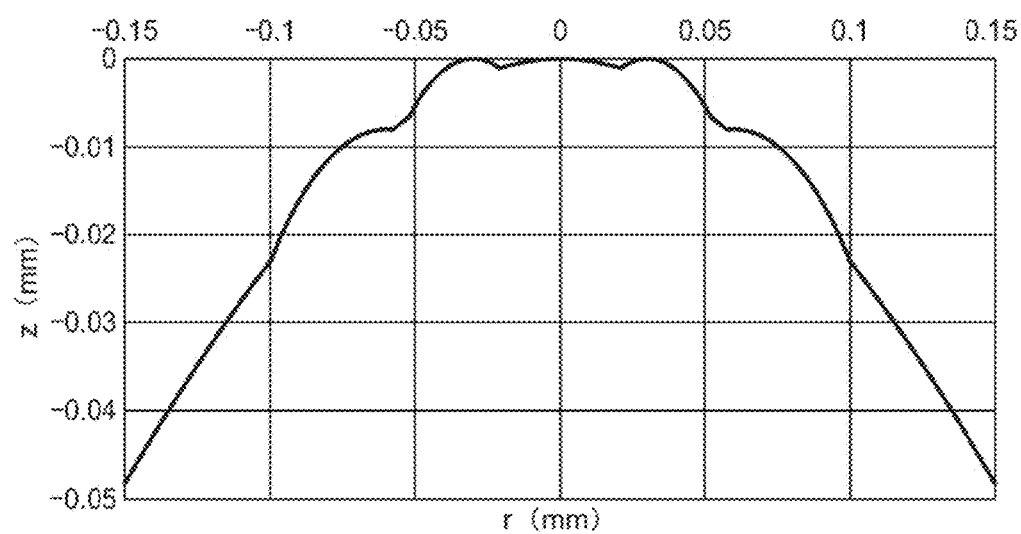
FIG. 13 shows a cross section of the exit surface of Example 5, which contains the optical axis.

FIG. 13 shows a cross section of the exit surface of Example 5, which contains the optical axis. Example 5 has two second light-collecting areas.

The shapes of the surface of the first light-collecting area and the surfaces of the second light-collecting areas can be expressed by the following mathematical expression.

$$z = \frac{cr^2}{1 + \sqrt{1-(1+k)c^2r^2}} + \sum_{i=1}^{N} A_i r^i$$

$$c = 1/R$$

$$r^2 = x^2 + y^2$$

c represents curvature, R represents radius of curvature, k represents the conic constant, i represents degree of the aspherical surface and Ai represents an aspherical coefficient.

The first light-collecting area is of the shape that is obtained by rotating the curve expressed by the above-described mathematical expression around the optical axis. r represents distance from the optical axis, and z represents coordinate in the optical axis direction with respect to the vertex of the exit surface (the point at which r=0 and z=0 in FIG. 13). Concerning z, the direction in which light travels is the positive direction.

Table 13 shows constants of the first light-collecting area of the exit surface.

TABLE 13

| R | −0.2012 |
|---|---|
| k | −2.3288 |

The surface of the second light-collecting area that is the closest to the optical axis is of the shape that is obtained by rotating the curve that has the vertex at $r_1$=0.030 mm in the r direction and $z_1$=0.000 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area that is the closest to the optical axis is of an annular curved surface (a hump) in a range from r=0.021 mm to 0.052 mm with respect to the vertex of the first light-collecting area.

Table 14 shows constants of the second light-collecting area that is the closest to the optical axis.

TABLE 14

| Items | Second light-collecting area that is the closest to the optical axis |
|---|---|
| R | −0.0400 |
| k | 0.0000 |
| $r_1$ | 0.060 |
| $z_1$ | 0.000 |

The second light-collecting area that is the second closest to the optical axis is of the shape that is obtained by rotating the curve that has the vertex at $r_2$=0.060 mm in the r direction and $z_2$=−0.008 mm in the z direction with respect to the vertex of the first light-collecting area and is expressed by the above-described mathematical expression around the central axis of the exit surface, that is the optical axis. r in the above-described mathematical expression represents distance from the straight line that passes through the vertex of the second light-collecting area and is parallel to the optical axis, and z in the above-described mathematical expression represents coordinate in the optical axis direction with respect to the vertex of the second light-collecting area. Concerning z, the direction in which light travels is the positive direction. The second light-collecting area that is the second closest to the optical axis is of an annular curved surface (a hump) in a range from r=0.058 mm to 0.100 mm with respect to the vertex of the first light-collecting area.

Table 15 shows constants of the second light-collecting area that is the second closest to the optical axis.

TABLE 15

| Items | Second light-collecting area that is the second closest to the optical axis |
|---|---|
| R | −0.0600 |
| k | 0.0000 |
| $r_2$ | 0.060 |
| $z_2$ | −0.008 |

The optical coupling efficiency from the light-emitting element 200 to the optical fiber 300 in Example 5 is 46.6%, and the amount of light that the optical fiber 300 receives is 59.7% of that in the case of the comparative example.

Summary of Examples

Table 16 shows values of refractive index of the exit surface of each example. The unit of refractive index is the inverse of millimeter.

TABLE 16

| Examples | Refractive power | | |
|---|---|---|---|
| | First light-collecting area $\phi_0$ | Second light-collecting area that is the closest to the optical axis $\phi_1$ | Second light-collecting area that is the second closest to the optical axis $\phi_2$ |
| Example 1 | 3.173 | 12.766 | — |
| Example 2 | 3.173 | 12.766 | — |
| Example 3 | 3.173 | 6.383 | 4.559 |
| Example 4 | 3.173 | 9.119 | 7.092 |
| Example 5 | 3.173 | 15.985 | 10.639 |

The values of refractive power of the second light-collecting areas of all the examples satisfy Expression (2). Further, the values of refractive power of the second light-collecting areas besides that of the second light-collecting area that is the second closest to the optical axis of Example 3 satisfy Expression (3).

Table 17 shows values of l1 of respective examples. The unit of length is millimeter.

TABLE 17

| Examples | l1 |
|---|---|
| Example 1 | 5.00E−3 |
| Example 2 | 1.00E−03 |
| Example 3 | 3.00E−03 |
| Example 4 | 4.00E−03 |
| Example 5 | 0.00E−03 |

From Table 16, the maximum value of refractive power among the values of the second light-collecting area that is the closest to the optical axis in each example is 15.985, and its inverse is 0.062559. Accordingly, the inverse of refractive power of the second light-collecting area that is the closest to the optical axis in each example is 0.062559 or more, and therefore Expression (1) is satisfied.

Table 18 shows values of l2 of respective examples. The unit of length is millimeter.

TABLE 18

| Examples | l2 |
|---|---|
| Example 3 | 1.50E−02 |
| Example 4 | 2.10E−02 |
| Example 5 | 8.00E−03 |

From Table 16, the maximum value of refractive power among the values of the second light-collecting area that is the closest to the optical axis in each example is 10.639, and its inverse is 0.093993. Accordingly, the inverse of refractive power of the second light-collecting area that is the second closest to the optical axis in each example is 0.093993 or more, and therefore Expression (1) is satisfied.

Table 19 shows the numerical value of the left side, the numerical values used for calculation of the right side and the numerical value of the right side of Expression (4) for each example. The unit of length is millimeter.

TABLE 19

| | Expression (4) | | | | | | |
|---|---|---|---|---|---|---|---|
| Examples | h$\phi$1 (Left side) | $\phi$1 | $\phi$0 | l1 | h1a | sag1a | Right side |
| Example 1 | 0.052 | 12.766 | 3.173 | 0.005 | 0.046 | 5.15E−03 | 0.0347 |
| Example 2 | 0.030 | 12.766 | 3.173 | 0.001 | 0.024 | 1.39E−03 | 0.0178 |
| Example 3 | 0.030 | 6.383 | 3.173 | 0.003 | 0.036 | 3.17E−03 | 0.0182 |
| Example 4 | 0.040 | 9.119 | 3.173 | 0.004 | 0.040 | 3.98E−03 | 0.0264 |
| Example 5 | 0.030 | 15.958 | 3.173 | 0.000 | 0.014 | 1.07E−03 | 0.0108 |

According to Table 19, each example satisfies Expression (4).

Table 20 shows the numerical value of the left side, the numerical values used for calculation of the right side and the numerical value of the right side of Expression (5) for each example. The unit of length is millimeter.

TABLE 20

| | Expression (5) | | | | | | |
|---|---|---|---|---|---|---|---|
| Examples | h$\phi$1 (Left side) | $\phi$1 | $\phi$0 | l1 | h1b | sag1b | Right side |
| Example 1 | 0.052 | 12.766 | 3.173 | 0.005 | 0.080 | 1.53E−02 | 0.0588 |
| Example 2 | 0.030 | 12.766 | 3.173 | 0.001 | 0.054 | 7.03E−03 | 0.0397 |
| Example 3 | 0.030 | 6.383 | 3.173 | 0.003 | 0.073 | 1.27E−02 | 0.0359 |
| Example 4 | 0.040 | 9.119 | 3.173 | 0.004 | 0.075 | 1.34E−02 | 0.0478 |
| Example 5 | 0.030 | 15.958 | 3.173 | 0.000 | 0.052 | 6.58E−03 | 0.0408 |

According to Table 20, each example satisfies Expression (5).

In each example, the amount of light that the optical fiber receives has been reduced by 10% to 40% compared with the comparison example by means of the second light-collecting area or areas.

As described above, the surface of a second light-collecting area is formed by rotating a curve around the optical axis. A continuous surface may be formed by rotating the curve 360 degrees around the optical axis. Alternatively, surfaces of a second light-collecting area may be formed by rotating the curve in certain angle ranges, for example, an angle range from 0 to 30 degrees, that from 120 degrees to 150 degrees, and that from 240 degrees to 270 degrees around the optical axis, and in the other angle ranges the surface of the first light-collecting area may be left unchanged. Even in this case, portions of the circle shown in FIG. 4 are formed, and therefore alignment of the optical system can be carried out according to the procedure shown in FIG. 5.

In the examples described above, optical elements for coupling light emitted by a light-emitting element to an optical transmission line are described. In other embodiments, an optical element according to the present invention can be used for coupling light emitted by an optical transmission line to a light-receiving element such as a photo-detector.

What is claimed is:
1. An optical element to be interposed between an optical transmission line and a light-emitting element or a light-receiving element such that an optical path from one side to the other passes through the optical element,
wherein at least one surface of the optical element is provided with a first light-collecting area and a second light-collecting area, a surface of the first light-collecting area is configured such that light from the one side is received by the other side, and a surface of the second light-collecting area is an annular surface or a part of the annular surface and is configured such that light that has passed through the second light-collecting area forms an image in the shape of a ring or a part of the ring at a position between the optical element and the other side.

2. An optical element according to claim 1 wherein the at least one surface is the surface on the exit side of the optical element.

3. An optical element according to claim 2 configured such that with an optical path of a ray of light passing through the vertex of the surface of the first light-collecting area and the center of the end face of the optical transmission line as an optical axis, light that has entered the surface on the entrance side of the optical element is collimated to a beam parallel to the optical axis and then made to enter the surface on the exit side.

4. An optical element according to claim 1, wherein when the refractive power of the first light-collecting area is represented as $\phi_0$, the refractive power of the second light-collecting area is represented as $\phi_j$ and with an optical path of a ray of light passing through the vertex of the surface of the first light-collecting area and the center of the end face of the optical transmission line as an optical axis, the distance in the optical axis direction between the vertex of the surface of the first light-collecting area and the vertex of the surface of the second light-collecting area is represented as lj, the first and second light-collecting areas are configured such that $$1.4\phi_0 < \phi_j < 1/lj$$

is satisfied.

5. An optical element according to claim 4 wherein the first and second light-collecting areas are configured such that $$2.0\phi_0 < \phi_j$$

is further satisfied.

6. An optical element according to claim 1 wherein the first light-collecting area and the second light-collecting area are configured such that an optical path of light that has travelled from the one side and has passed through the first light-collecting area and an optical path of light that has travelled from the one side and has passed through the second light-collecting area do not overlap with each other.

7. An optical element according to claim 1 wherein with an optical path of a ray of light passing through the vertex of the surface of the first light-collecting area and the center of the end face of the optical transmission line as an optical axis, the surface of the first light-collecting area is of the shape that is obtained by rotating a curve by a certain angle around the optical axis as the central axis.

8. An optical element according to claim 1 wherein with an optical path of a ray of light passing through the vertex of the surface of the first light-collecting area and the center of the end face of the optical transmission line as an optical axis, the surface of the second light-collecting area is of the shape that is obtained by rotating a curve by a certain angle around the optical axis as the central axis.

9. An optical element according to claim 1 wherein the at least one surface is provided with a plurality of second light-collecting areas.

10. An optical element according to claim 1 wherein the first light-collecting area and the second light-collecting area are configured such that the amount of light that is transmitted from the one side to the other is reduced by 10% to 40% compared with an optical element formed by the first light-collecting area alone.

* * * * *